United States Patent [19]

Martin

[11] Patent Number: 5,868,524
[45] Date of Patent: Feb. 9, 1999

[54] CLAMP SYSTEM AND METHOD FOR CONNECTING TUBULAR BODIES TOGETHER

[76] Inventor: Charles F. Martin, P.O. Box 354, Porter, Tex. 78365

[21] Appl. No.: 686,776

[22] Filed: Jul. 25, 1996

[51] Int. Cl.⁶ .............................. F16L 17/10; F16L 33/16
[52] U.S. Cl. ............................................. 405/170; 285/97
[58] Field of Search ..................................... 405/170, 169; 285/86, 96, 97

[56] References Cited

U.S. PATENT DOCUMENTS

| | | | |
|---|---|---|---|
| 2,083,842 | 6/1937 | Henning | 285/3 |
| 2,451,354 | 10/1948 | Ohls | 285/105 |
| 3,236,544 | 2/1966 | Brown | 285/97 |
| 3,420,554 | 1/1969 | Straub | 285/97 |
| 3,572,769 | 3/1971 | Lingl | 285/96 |
| 3,718,350 | 2/1973 | Klein | 285/39 |
| 3,810,665 | 5/1974 | Rodgers | 285/97 |
| 3,860,270 | 1/1975 | Arnold | 285/93 |
| 3,874,706 | 4/1975 | Arnold | 285/24 |
| 3,915,480 | 10/1975 | Kish et al. | 285/148.13 |
| 3,944,263 | 3/1976 | Arnold | 285/96 |
| 3,977,197 | 8/1976 | Marsh et al. | 60/659 |
| 4,005,881 | 2/1977 | Burton et al. | 285/111 |
| 4,045,054 | 8/1977 | Arnold | 285/18 |
| 4,153,280 | 5/1979 | Bunyan | 285/97 |
| 4,171,883 | 10/1979 | Eijkelenboom | 285/261 |
| 4,371,198 | 2/1983 | Martin | 285/145.1 |
| 4,373,377 | 2/1983 | Smith et al. | 73/23.31 |
| 4,500,117 | 2/1985 | Ayers et al. | 285/86 X |
| 4,676,531 | 6/1987 | Martin | 825/96 |

FOREIGN PATENT DOCUMENTS

| | | |
|---|---|---|
| 0072199 | 2/1983 | European Pat. Off. . |
| 36064 | 4/1930 | France . |
| 537748 | 1/1956 | Italy . |
| 351462 | 1/1961 | Switzerland . |
| 650641 | 2/1951 | United Kingdom . |
| 1345514 | 1/1974 | United Kingdom . |
| 1401438 | 7/1975 | United Kingdom . |

*Primary Examiner*—Tamara L. Graysay
*Assistant Examiner*—Tara L. Mayo
*Attorney, Agent, or Firm*—Kuffner & Associates; Kenneth E. Kuffner; Nick A. Nichols, Jr.

[57] ABSTRACT

A clamp system and method used to remotely connect or disconnect a submerged pipeline from another submerged pipeline or from a riser line or the like. When used with a riser line, the riser line end of the connector carries calipers that pivot open to receive or release the pipeline connection end. The mating connector end sections are radially enlarged and are provided with annular grooves that are in register when the sections are abutted to house an annular, hollow metal seal ring. With the calipers closed and securing the two connection end sections, a locking collar is moved over the free end of the calipers, and the seal ring is energized by applying high pressure fluid into the seal ring, causing the ring to expand and seal the mating connector ends, restrict lateral movement between the ends, and stress the connection to maintain the clamp. The ring structure is self-supporting in its expanded configuration to retain the seal and structural support when the pressure of the energizing fluid is released. The free ends of the calipers are equipped with hydraulically actuated push rods that force the calipers to pivot open to permit separation of the connector ends as required, for example, to replace a worn riser pipe. The expanded ring and flexible pipe end connector are retrieved to the surface and replaced with a new hose and unexpanded ring. Connection or reconnection to the pipe line, or release from the pipeline, may be accomplished with a remotely operated underwater vehicle (ROV). Seal replacement and reconnection may also be performed by the ROV without retrieval of the connector to the surface.

34 Claims, 5 Drawing Sheets

CLAMP SYSTEM AND METHOD FOR CONNECTING TUBULAR BODIES TOGETHER

BACKGROUND OF THE INVENTION

1. Field of the Invention

The invention relates generally to the field of connecting tubular members to each other. More specifically, the present invention relates to a system for connecting a submerged metal flowline to a flexible riser pipe that extends from the submerged flow line to a surface production or drilling facility.

2. Description of the Prior Art

It is necessary in many offshore operations to provide flow line connections between above-water facilities and submerged pipelines that may lie hundreds of feet below the water surface. Such a need arises, for example, where oil or gas from a production platform is delivered to a submerged pipeline. The riser line that extends from the platform to the pipeline is constantly moving due to platform movement, product surges, water action, and other causes. These actions cause the riser lines to deteriorate over time, requiring that they be periodically disconnected from the pipeline and replaced.

Conventional underwater connectors frequently require the assistance of divers to connect or disconnect the riser and the pipeline, which can render the replacement procedure slow and expensive. The typical nut-and-bolt-type flange connector is also relatively difficult and time-consuming to install, particularly when the installation must be performed at extreme water depths. Welding-type connections are similarly undesirable.

A variety of systems have been devised to eliminate the need for bolt-on or welded connectors in underwater pipe connection technology. In my U.S. Pat. No. 4,676,531, a system for clamping and sealing two pipe sections together is disclosed in which a hollow metal ring structure is expanded by hydraulic pressure to lock telescoped pipe sections together. While the technique described in my patent is extremely efficient and significantly improves on conventional welding or nut-and-bolt-type flange connections, it is not well suited for use in connecting pipes that must be periodically separated and reconnected.

SUMMARY OF THE INVENTION

The clamp system of the present invention allows quick, simple, and efficient connection and disconnection of abutting tubular members as may be employed, for example, in the connection of sections of a submerged pipeline and a flexible riser line or of two sections of submerged pipeline. The clamp system requires a minimum of simple mechanical movements to either grip, seal, and clamp the end connection sections of the abutting tubular members together or to disengage previously clamped connection sections.

The engagement and disengagement motions require pivotal movement of calipers that are carried by, and swing from, the flexible riser line connection sections. The calipers are locked in closed, clamped position over the pipeline connection section by sliding a collar from the pivoted end of the calipers up and over the closed, free end of the calipers. With the calipers closed and locked down by the collar, hydraulic pressure is used to permanently expand a hollow, deformable metal seal ring positioned in annular mating slots formed in abutting connection sections. When thus expanded, the seal ring provides a pressure seal for the connection and imposes mechanical stresses in the connection to keep the connection clamped. The functions of closing the calipers, sliding the locking collar, and pressurizing the seal ring are simple mechanical procedures that are easily performed by an ROV without diver assistance. By contrast, a typical procedure for joining conventional submerged connectors requires nut and bolt closure devices or welding procedures or other more complicated mechanical procedures that generally require diver assistance.

Release of the clamp system of the present invention is similarly accomplished with a minimum of simple, mechanical movements that may be efficiently performed by an ROV. The release is effected by sliding the locking collar down and away from the free end of the pivoted calipers, applying hydraulic pressure to radial push rods that swing the calipers away from the pipeline connection section and release the flexible line connection section from the pipeline. The pipeline connection section has a radially enlarged area with an annular groove for receiving the seal ring.

Once the clamp system is released, the flexible line may be retrieved to the water surface, where a new flexible line is connected to the connection section. The calipers and hydraulic actuators are inspected and reconditioned as required, and a new, unexpanded seal ring is installed in the connection section. The connection section of the flexible line is reconnected to the pipeline by an ROV in the manner previously described.

From the foregoing, it will be appreciated that a primary object of the clamping system of the present invention is to provide a mechanical connector for joining together submerged tubular members that can be operated with simple mechanical movements.

Another object of the present invention is the provision of a system for making repeated connections between an underwater pipeline and a riser pipe connecting the pipeline to a facility above the water surface. The submerged component of the connection comprises a simple, one-piece element with a ring groove and a retaining shoulder for receiving the caliper latches. The absence of moving parts and the design and construction of the pipeline connection section minimize the possibility of malfunction in the submerged part of the connector. The section of the connection with moving parts and pressure lines is retrieved to the surface with the flexible pipe so that the section may be inspected and serviced as necessary.

Yet another object of the present invention is to provide a connection in which a seal ring is permanently expanded to seal between abutting tubular members and aid in securing the connection against mechanical separation.

It is also an object of the present invention to span abutting connection members with a retaining structure that is configured to hold the connection members together without the necessity for threaded engagement or welding procedures.

The foregoing features, advantages, and objects of the invention, as well as other features apparent to those skilled in the art, will be more fully described and understood by reference to the following drawings, specification, and claims.

DESCRIPTION OF THE PREFERRED EMBODIMENTS

Figure 1:
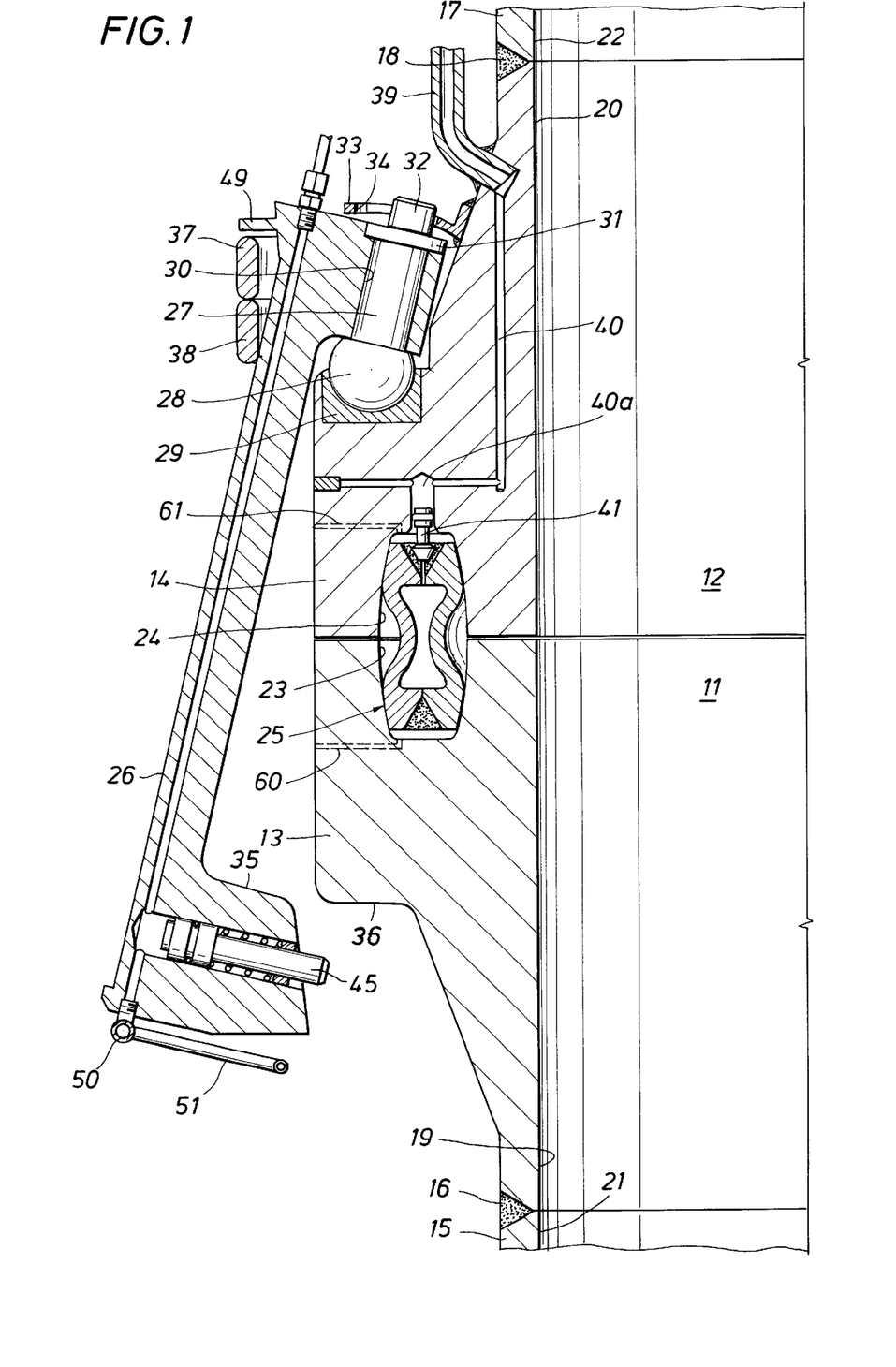
FIG. 1 is a vertical elevation, in quarter section, illustrating the clamp system of the present invention in its initial open position before being clamped together to secure a flexible line section to a pipeline section before the seal ring has been expanded.

The clamp system of the present invention, indicated generally at 10 in FIG. 1, includes a pipeline end connection section 11 and a flexible line end connection section 12. The sections 11 and 12 are substantially tubular bodies that include radially enlarged abutting annular upsets 13 and 14, respectively. The section 11 forms the end connection of a substantially rigid pipeline 15 to which it is permanently secured, as by a weld 16, or other suitable means. The section 12 is similarly connected to a flow line 17, usually flexible, by a weld 18 or other suitable means.

The tubular connection sections 11 and 12 are provided with central passages 19 and 20, respectively, that communicate with central passages 21 and 22 in the pipeline 15 and flow line 17, respectively. It will be understood that, when connected, the clamp system provides a continuous flow passage from the flow line 17 to the pipeline 15 via the passage route 22, 20, 19, 21.

The upsets 13 and 14 are provided with annular grooves 23 and 24, respectively, that are in register with, and that receive, a hollow annular, expandable seal ring 25. As will hereinafter be more fully described, the seal ring 25 is expanded by hydraulic pressure to seal the junction of the two end connection sections 11 and 12.

The sections 11 and 12 are adapted to be held to each other by a plurality of calipers, such as the caliper 26 that pivots from the connection end 12 to the connection end 11 and latches over an annular shoulder 27 formed at the base of the upset 13. The latched position of the calipers is illustrated in FIG. 2.

Figure 2:
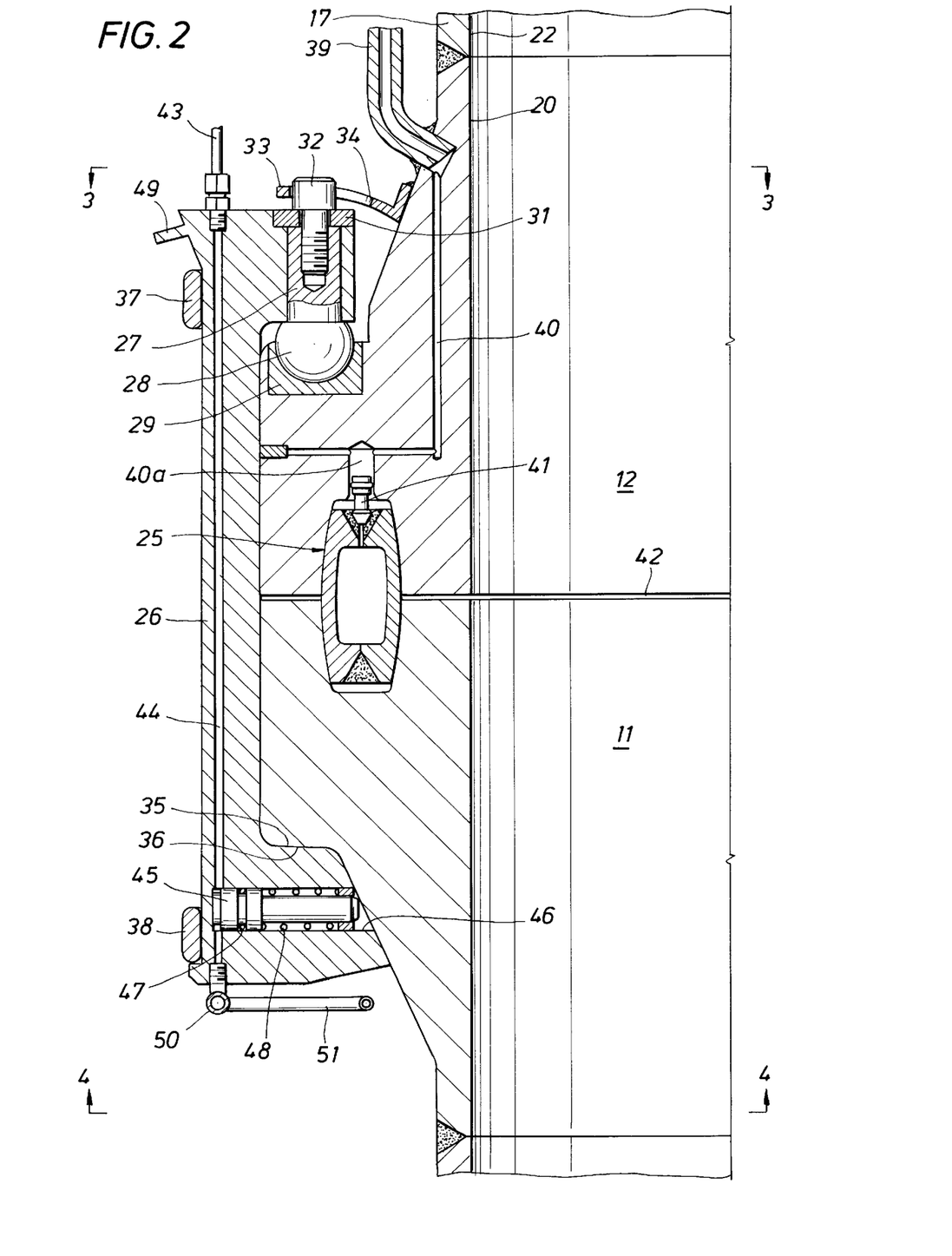
FIG. 2 is a view similar to FIG. 1 illustrating the clamp system of the present invention closed and locked with the seal ring expanded.
Figure 3:
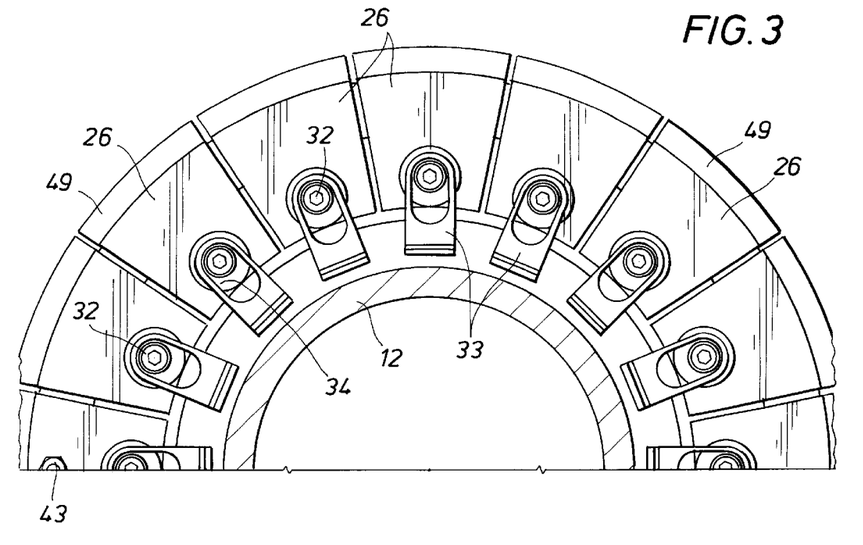
FIG. 3 is a horizontal, half-sectional view taken along the line 3—3 of FIG. 2 illustrating one embodiment of the pivoted connection of the calipers to the flexible line end of the connector of the present invention.

As best illustrated by joint reference to FIGS. 1 and 2, the caliper 26 is pivotally mounted on the retrievable flexible line connector 12 by a connector rod 27 that terminates in an enlarged pivot ball 28 that, in turn, is received in a pivot ball socket 29. The rod 27 extends through a closely surrounding axial bore 30 in the upper end of the caliper 26. A retainer washer 31 is held in place by an allen head bolt 32 received in a threaded bore in the connector rod 27 to rigidly secure the pivot ball to the caliper. As best illustrated by joint reference to FIGS. 1, 2, and 3, a retaining finger 33 extending from the section 12 traps the pivoting caliper end to retain the ball 28 in the socket 29. A slot 34 in the finger 33 permits limited lateral movement of the bolt 32 as required to accommodate pivotal motion of the caliper radially away from the section 12.

The caliper 26 is pivoted closed, as illustrated in FIG. 2, to place an internal caliper shoulder 35 against the oppositely facing shoulder 29 on the annular upset 13. In this position, the caliper 26 spans the two connection sections 11 and 12 to prevent them from separating axially. First and second keeper collars 37 and 38, respectively, are moved from their positions illustrated in FIG. 1 into the positions illustrated in FIG. 2 after the calipers are latched closed. The collars 37 and 38 hold the calipers 26 in their latched, or closed, position while the seal ring is expanded.

After the calipers 26 are closed and the keeper collars 37 and 38 are positioned as illustrated in FIG. 2, hydraulic pressure is applied through a high pressure fluid line 39 through a fluid passage 40 to a high pressure insert fixture 41 received in a bore 40a in section 12 and then into the hollow interior of the seal ring 25. The pressure of the fluid supplied through the insert fixture 41 expands the ring 25 into the form illustrated in FIG. 2. The abutting end surfaces of the connection sections 11 and 12 are forced axially away from each other as the seal ring expands to produce a small gap 42 that permits the escape of fluid trapped in the grooves 23, 24 to allow full expansion of the seal ring 25. Fluid trapped at the lower and upper ends of the grooves 23 and 24 is vented by relief passages 60 and 61, respectively, as best illustrated in FIG. 1. Once expanded, the ring 25 becomes self-supporting independently of the expansion fluid. However, if desired, a check valve such as a ball check valve (not illustrated) can be positioned, as, for example, in bore 40a. In its expanded condition, the ring 25 seals against the internal walls of the grooves 23 and 24 to provide an extremely strong, high pressure, metal-to-metal seal between the connection sections 11 and 12. The axial force exerted by the expanded seal also serves to retain the calipers in their closed positions to further enhance the strength and integrity of the clamping system. Expansion of the seal ring 25 can be accomplished by fluid supplied from an ROV or by a fluid supply line from the platform.

Release of the calipers is effected by moving the lower keeper collar 38 toward collar 37, i.e., to the position essentially shown in FIG. 2, and then applying hydraulic fluid pressure to a pressure line 43 that connects to a fluid passage 44 formed in the caliper 26. The passage 44 communicates with a release push rod and piston 45 carried in a radial caliper bore 46. An elastomeric O-ring seal 47 around the piston 45 seals against the surrounding caliper bore 46 to provide a sliding seal as the piston is driven radially inwardly against the outer wall of the connection section 11. This action forces the caliper 26 to pivot radially away from the upset 13, permitting the shoulders 35 and 36 to be moved out of engagement to release the latch between the pipeline end 11 and the flexible line end 12. A resilient coil spring 48 returns the piston 47 to its retracted position when the pressure in passage 44 is reduced so that the two connection sections may be separated. A keeper arm 49 at the upper end of the caliper 26 prevents the keeper collars 37 and 38 from slipping over the top of the connector assembly when the calipers are pivoted out.

Figure 4:
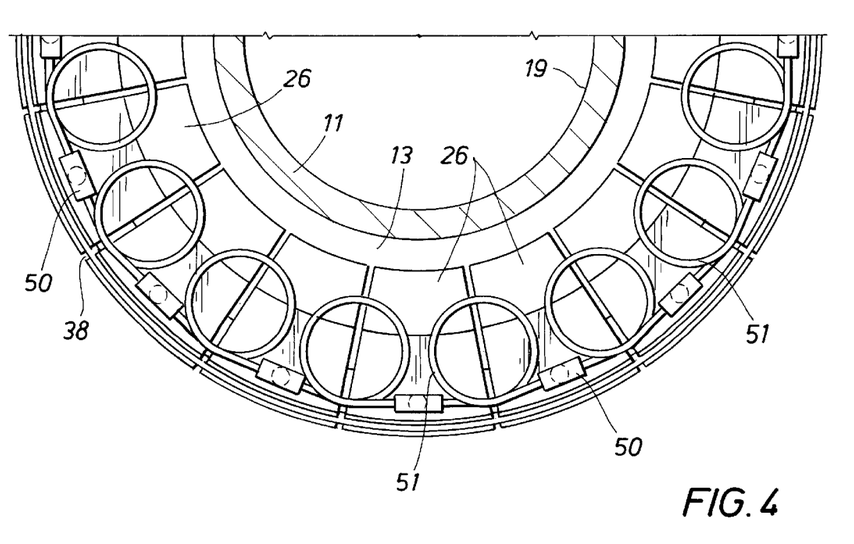
FIG. 4 is a horizontal half-sectional view of the connector taken along the line 4—4 of FIG. 2 illustrating the manifold connection of the release mechanism of the present invention.

The fluid passage 44 is formed in only one of the calipers 26, referred to herein as the prime caliper. The pressure supplied to the prime caliper communicates with release pistons 45 formed at the free end of each of the other calipers in the clamp system via a flexible manifold system illustrated in FIG. 4. Thus, the release fluid pressure supplied through the passage 44 and the prime caliper illustrated in FIGS. 1 and 2 is conveyed through a T-fitting 50 to one end of a flexible tube loop 51. The second end of the tube loop 51 is connected to a T-fitting that communicates the fluid pressure to the release piston in the adjacent caliper. This process is repeated with each adjacent caliper back to the prime caliper. Each release piston is thereby provided with fluid pressure from the base of a T-fitting, which, in turn, is connected hydraulically via the T to the release piston in the adjacent caliper. This arrangement assures substantially simultaneous release of all of the calipers so that the pipeline end is cleanly released. The loops in the flexible tubes accommodate the pivotal movement of the calipers occurring during the connection and release procedures.

Although not necessary, if desired, connection section 11 or 12 can be provided with hydraulically actuated push rods or other similar mechanisms that can either act against the end of seal ring 25 received in groove 23 or mechanically secure the ring to the end connector 12 to ensure that the seal ring 25 is pushed out of groove 23 or retained with the end connector 12 when the connection is separated.

Figures 5, 6:
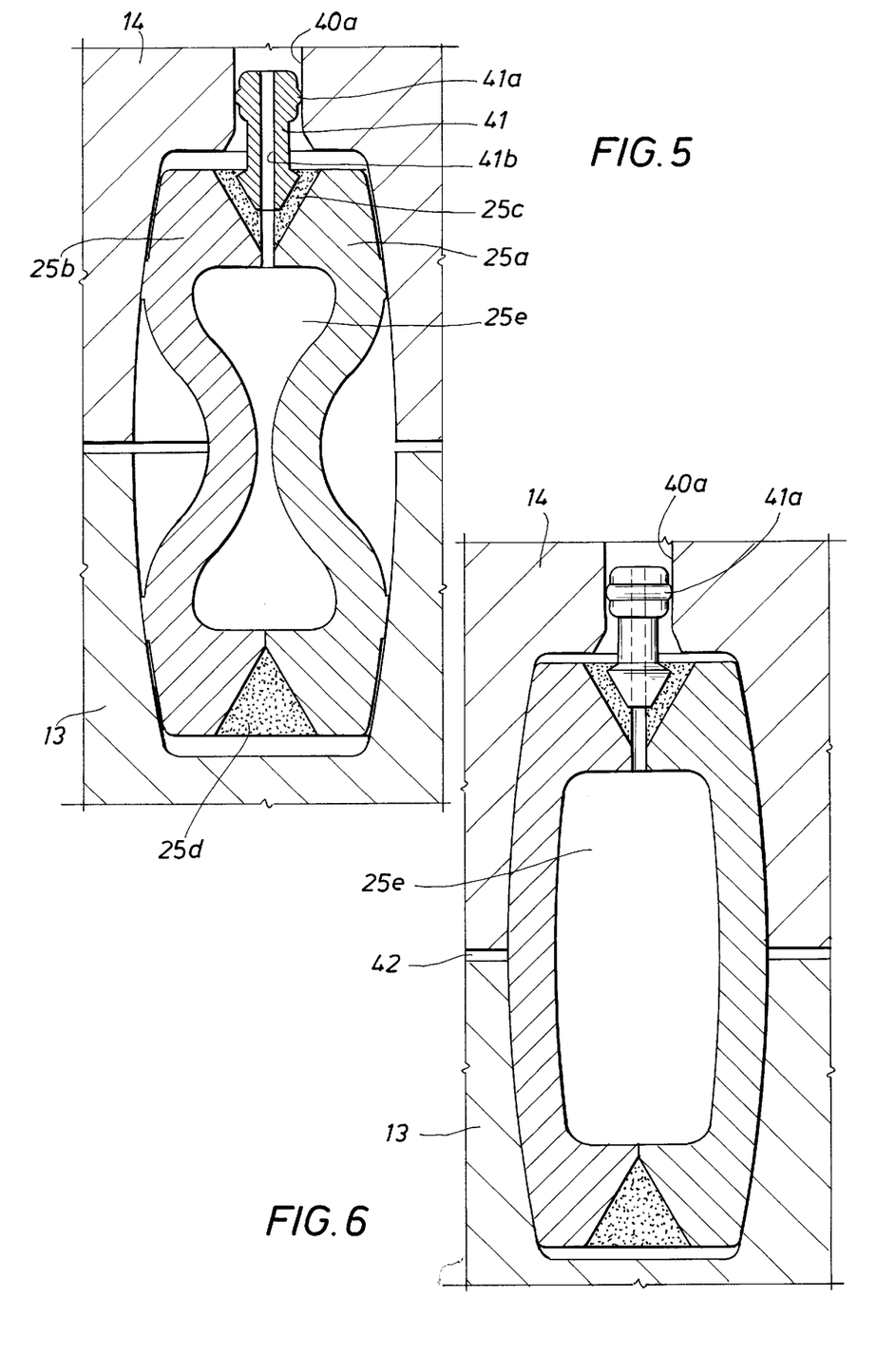
FIG. 5 is an enlarged vertical cross-sectional view illustrating details in the construction and operation of the unexpanded seal ring of the present invention.
FIG. 6 is a view similar to FIG. 5 illustrating the seal in its expanded, sealed, and locked condition.

FIGS. 5 and 6 illustrate details in the fabrication and operation of the seal ring 25. In a preferred embodiment, the ring 25 may be constructed of two symmetrical annular components 25a and 25b that are welded together at 25c and 25d along their contacting surfaces. The ring may preferably be formed of a suitable metal such as stainless steel. The high pressure insert 41 is preferably welded into the outer extremity of the ring 25 so that it may be sealingly inserted into a receiving bore 40a, communicating with the high pressure fluid passage 40. The insert 41 is provided with an annular flange 41a that engages the bore 40a in a pressure-tight, friction fit. A central opening 41b in the insert 41 communicates fluid pressure from the bore 40a to an annular interior chamber 25e within the ring 25.

Pressure applied to the interior area 25a of the ring 25 forces the concave sidewall sections 25a and 25b (as viewed externally of the ring in FIG. 5) over center, outwardly into a convex shape as illustrated in FIG. 6. The convex shape of the ring 25 resists collapse of the ring under the influence of pressure within the connector, even in the absence of any check valve to prevent escape of fluid from chamber 25e.

Figure 7:
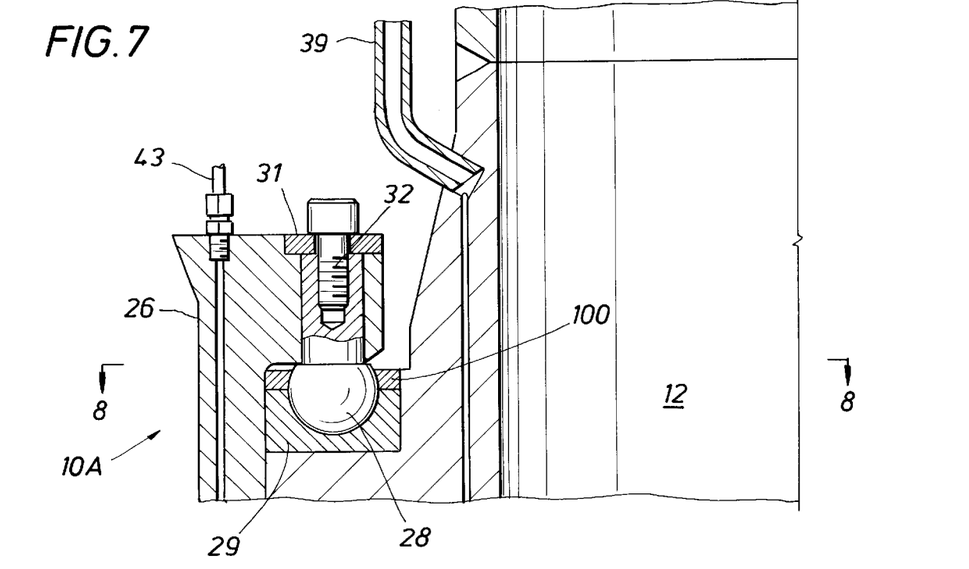
FIG. 7 is a detailed, vertical quarter-sectional view illustrating a modified caliper connection assembly for pivotally securing the calipers to the flexible line end connection of the clamp system.
Figure 8:
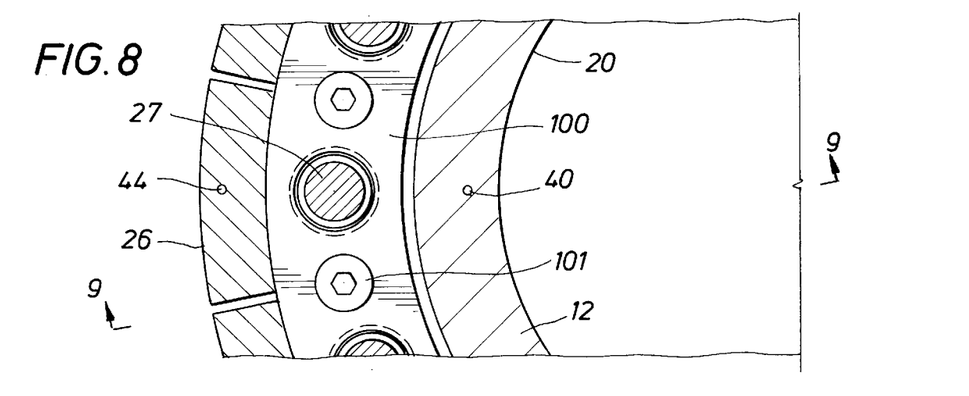
FIG. 8 is a horizontal cross-sectional view taken along the line 8—8 of FIG. 7 illustrating details in the construction of the modified caliper connection assembly.
Figure 9:
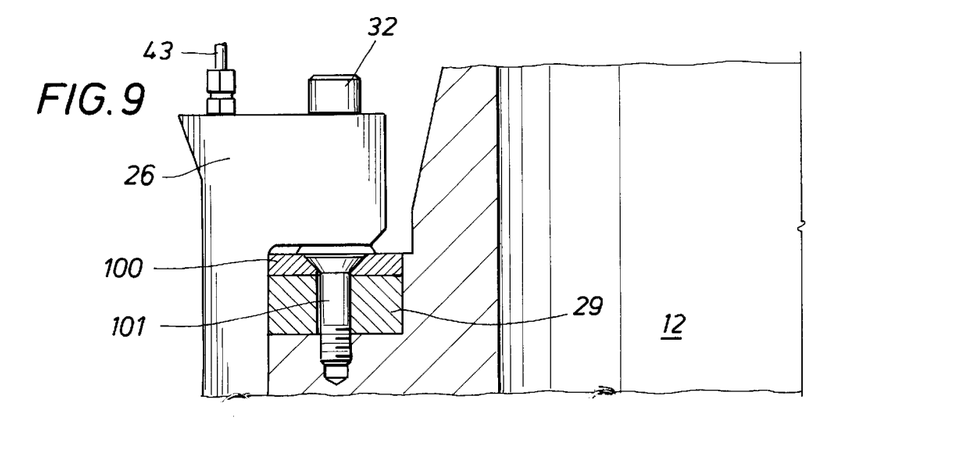
FIG. 9 is a vertical sectional view taken along the line 9—9 of FIG. 8 illustrating additional details in the construction of the modified caliper connection assembly.

FIGS. 7–9 illustrate a modified form of the invention indicated generally at 10a in which the pivot connection is held to the connection end section by a socket retainer ring 100 that encircles and traps the ball 28 to hold it within the socket 29. The ring 100 encircles the upper end of the enlarged area 14 and is provided with frustospherical openings 101 at the position of each ball. The openings 101 cooperate with the socket 29 to permit pivotal movement of the ball 28 while restraining axial ball movement. Flat-top allen head screws 102 hold the ring 100 in place on the end connection 12. In all other respects, the modified form of the clamp assembly 10a is similar to the assembly described with reference to FIGS. 1–6.

In the operation of the clamp system of the present invention, the pipeline end 11 of a pipeline 15 is connected to the pipeline before the line is laid, or is welded or otherwise affixed to the pipeline if the pipeline is already submerged. The initial attachment of the end connection to the end of a submerged pipeline may require diver assistance; however, subsequent attachment or removal of the riser line connected to the pipeline end may be accomplished without such assistance.

The flow line end 12 of the system is equipped with an unexpanded seal ring 25. The vacant ring area 25e and all pressure lines and flow passages connecting with the ring and release pistons are prefilled with propylene glycol or other suitable hydraulic fluid.

An ROV is employed to position the connection end 12 against the connection end 11 and shift the keeper ring 38 into its lower position to hold the calipers 26 in their locked position. The fluid in the line 39 is pressurized, either from the surface or the ROV, to expand the seal ring 25. In one embodiment of the invention, a pressure of approximately 15,000 psi is used to expand the seal ring into the condition illustrated in FIG. 2.

In releasing the connector 10, the ROV is employed to shift the ring 38 against the ring 37. Pressure is applied to the pressure line 43 to depress the release pistons 45 and drive the calipers off of the shoulder 36. In one embodiment of the invention, employing sixteen calipers, a pressure of approximately 1,000 psi was used to release the calipers. Once the calipers release the pipeline end 11, the flow line 17 and attached connection section 12 may be pulled to the surface for repairing or replacing the flexible flow line. The seal ring 25 is removed and replaced by an unexpanded ring, and the previously described procedure may be repeated to reattach the flow line and the pipeline.

It will be understood that while preferred embodiments of the invention have been described in detail herein, the invention may be made and performed in various manners not expressly described. By way of example rather than limitation, the shoulder structure formed on the pipeline end of the connection may be a series of individual shoulder structures rather than the continuous annular shoulder illustrated in the drawings. Various other external surface configurations may also be provided on the connector to secure to the free end of the calipers. As another example, the ball and socket mounting of the caliphers may be modified by employing parallel, flat side walls on the ball section that engage opposing flat side walls in the socket structure to thereby permit pivotal caliper motion while restricting circumferential movement.

Similarly, while the hollow metal seal member is described as being formed by welding symmetrical pieces together, other fabrication techniques may be employed to build the ring.

It will also be understood that while the invention has been described for use in connecting an underwater pipeline to a flexible riser line, the invention may be used to connect two submerged pipeline sections together, either or both of which pipeline sections may be substantially rigid. Similarly, if it is not necessary or desirable to retrieve the connection section to the surface for replacement or repair, an ROV may perform the seal replacement procedure and all necessary reconnection procedures while both connection sections are submerged.

Accordingly, it will be appreciated that various modifications of the described embodiments may be made without departing from the spirit and scope of the present invention.

I claim:

1. A clamp system for connecting tubular members together, comprising:

a first connection section comprising a radially enlarged area at one axial end of a first tubular member;

a second connection section comprising a radially enlarged area at one axial end of a second tubular member;

an axially extending retaining structure adapted to hold said first and second connection sections to each other whereby said tubular members are joined at their axial ends; and an expandable seal disposed between said first and second connection sections in said radially enlarged areas adapted to be expanded into sealing engagement with said first and second connection sections for forming a seal between said tubular members.

2. A clamp system as defined in claim 1, wherein said retaining structure is adapted to release said first connection section while remaining connected with said second connection section whereby said first and second tubular members may be separated at their axial ends.

3. A clamp system as defined in claim 1, further including a release mechanism for disengaging said first connection section from said retaining structure whereby said first and second tubular members may be separated at their axial ends.

4. A clamp system as defined in claim 1, wherein said expandable seal comprises an annular, substantially hollow metallic body adapted to be expanded by hydraulic pressure.

5. A clamp system as defined in claim 4, wherein:

said retaining structure comprises a plurality of axially extending calipers connecting said first to said second connection section; and said calipers are adapted to pivot at their connection point with said second connection section when releasing from their connection point with said first connection section.

6. A clamp system as defined in claim 5, further including a hydraulically actuated release mechanism for pivoting said calipers away from said first connection section.

7. A clamp system as defined in claim 6, wherein said release mechanism includes hydraulically actuated push rods disposed for radial movement in one end of said calipers.

8. A clamp system as defined in claim 1, wherein:

said retaining structure comprises a plurality of axially extending calipers connecting said first to said second connection section; and said calipers are adapted to pivot at their connection point with said second connection section when releasing from their connection point with said first connection section.

9. A clamp system as defined in claim 1, wherein said first and second connection sections include laterally extending shoulders adapted to engage laterally extending shoulders formed on said retaining structure whereby axially developed forces tending to separate said tubular members are exerted against said engaged shoulders to prevent separation of said tubular members.

10. A clamp system as defined as claim 1, further including annular, registering recesses formed in said first and second connection sections for receiving said expandable seal.

11. A method for securing and sealing two tubular members to each other, comprising the steps of:

abutting axial ends of first and second tubular bodies together;

closing a spanning retaining structure carried by said first tubular body externally over said second tubular body to limit the axial movement of said two bodies away from each other; and expanding a pressure-expandable seal member disposed between said abutting axial ends to form a seal between said tubular bodies.

12. A method as defined in claim 11, further comprising the steps of:

releasing said two tubular bodies from each other; and moving said first tubular body, said seal member, and said spanning structure to a location away from said first body.

13. The method as defined in claim 12, further comprising the steps of:

replacing the expanded seal with an unexpanded seal;

re-abutting said axial ends of said first and second tubular bodies;

re-closing said spanning retaining structure; and expanding the unexpanded replacement seal.

14. The method as defined in claim 13, comprising the further step of pivoting said spanning retaining structure away from said second tubular body by applying a pressurized fluid to said retaining structure.

15. The method as defined in claim 14, wherein said seal member comprises an annular, hollow, metal body and the step of expanding further comprises applying a high pressure fluid to the hollow interior of said metal body.

16. The method as defined in claim 15, comprising the further step of:

disposing said seal member in annular grooves formed in the abutting ends of said first and second tubular bodies; and said spanning structure comprises a plurality of calipers pivoted from said first tubular body and adapted to pivot and close over shoulder structure formed on said second tubular body.

17. The method as defined in claim 11, wherein said seal member comprises an annular, hollow, metal body and the step of expanding further comprises applying a high pressure fluid to the hollow interior of said metal body.

18. The method as defined in claim 11 comprising the further step of pivoting said spanning retaining structure away from said second tubular body by applying a pressurized fluid to said retaining structure.

19. The method as defined in claim 18, wherein said seal member comprises an annular, hollow, metal body and the step of expanding further comprises applying a high pressure fluid to the hollow interior of said metal body.

20. The method as defined in claim 11, wherein:

said seal member is an annular, hollow metal body and comprising further the step of disposing said seal member in annular grooves formed in the abutting ends of said first and second tubular bodies; and said spanning structure comprises a plurality of calipers pivoted from said first tubular body and adapted to pivot and close over shoulder structure formed on said second tubular body.

21. The method as defined in claim 11, wherein said retaining structure is pivotally carried by said first tubular body, further comprising the steps of:

releasing said two tubular bodies from each other by pivoting said spanning retaining structure away from said second tubular body; and moving said first tubular body, said seal member, and said spanning structure to a location away from said first body.

22. The method as defined in claim 11, wherein at least one of the method steps is performed with the assistance of a remotely operated vehicle.

23. The method as defined in claim 11, wherein said first tubular body comprises the end of a riser line extending from a submerged pipeline and said second tubular body comprises the end of a submerged pipeline.

24. The method as defined in claim 23, wherein at least one step of the method is performed by a remotely operated vehicle.

25. A clamp mechanism for securing two tubular members to each other, comprising:

a first tubular end connection section;

a second tubular end connection section;

a retaining structure carried externally of said first end section and adapted to engage and secure said second end section;

a pivotal connection securing said retaining structure to said first end section whereby said retaining structure may be pivoted into or out of engagement with said second end section; and a pressure actuated release adapted to disengage said retaining structure from said second end section.

26. The clamp structure as defined in claim 25, further comprising an annular, pressure expandable, substantially hollow interior seal member adapted to be disposed between said first and second end sections for expanding to form a seal between said end sections.

27. The clamp mechanism as defined in claim 26, wherein said pressure actuated release mechanism includes a hydraulically actuated push rod for pivoting said retaining structure away from said second end section whereby said end sections may be separated after said seal member has been expanded.

28. The clamp mechanism as defined in claim 26, further comprising annular, registering grooves formed at the abutting ends of said first and second connection sections for receiving said seal member.

29. The clamp mechanism as defined in claim 28, wherein:

said retaining structure comprises a plurality of calipers pivotally mounted at one end of said first end section adapted to close over shoulder structure formed on said second end section to secure said first and second sections to each other; and said release mechanism includes radially movable, hydraulically actuated push rods carried in the non-pivoted ends of said calipers for pushing the non-pivoted ends of said calipers away from said second end sections to disengage said first and second end sections.

30. The clamp mechanism as defined in claim 29, further comprising a fluid pressure passage extending through said first end section and communicating with the hollow interior of said seal member for supplying a pressurized fluid to expand said seal member.

31. The clamp mechanism as defined in claim 30, further including axially movable keeper collars carried externally of said calipers for movement into and out of axial locations that respectively permit or prevent radial movement of said calipers away from said end sections.

32. The clamp mechanism as defined in claim 31, wherein said pressure seal member is constructed of a metal.

33. The clamp mechanism as defined in claim 26, further comprising annular, registering grooves formed at the abutting ends of said first and second connection sections for receiving said seal member.

34. The clamp mechanism as defined in claim 26, wherein said pressure seal member is constructed of a metal.

* * * * *